July 8, 1924. 1,500,810
J. P. GLASBY, JR
AIRCRAFT WING CONSTRUCTION
Filed Nov. 19, 1920 2 Sheets-Sheet 2
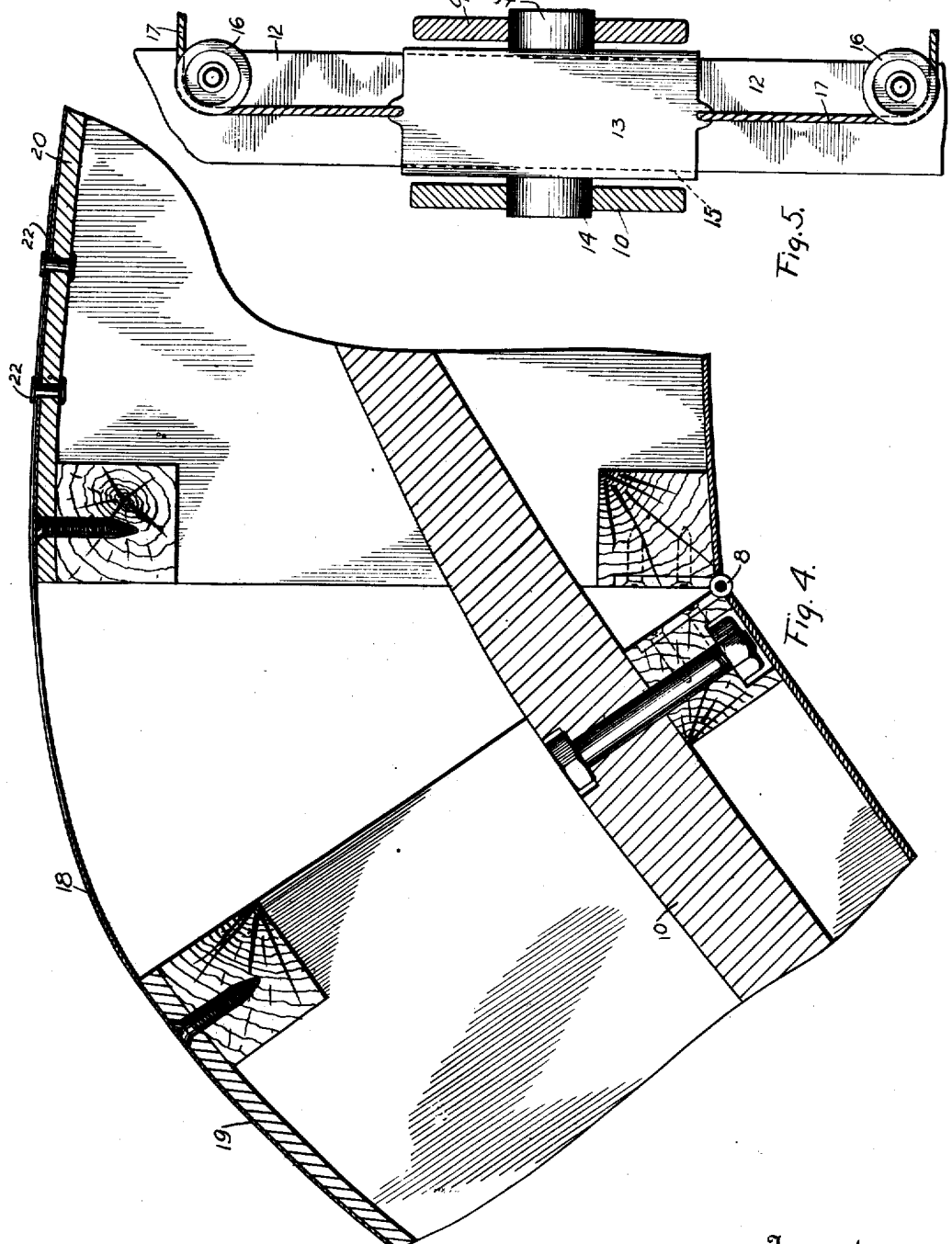
Inventor
Jonathan P. Glasby, Jr.
By his Attorney
Frederick Griswold Patented July 8, 1924.

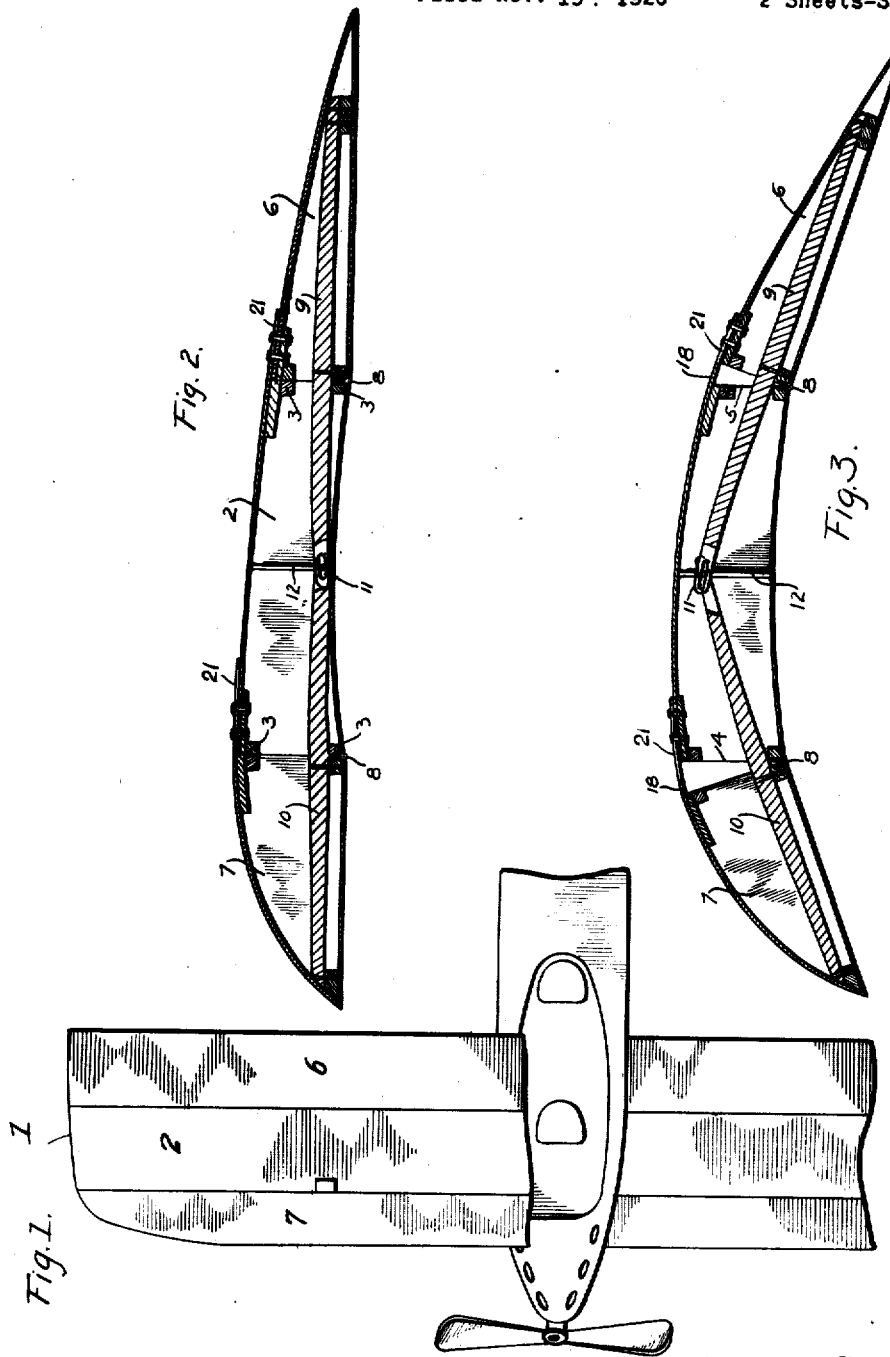

1,500,810

UNITED STATES PATENT OFFICE.

JONATHAN P. GLASBY, JR., OF EAST ORANGE, NEW JERSEY.

AIRCRAFT-WING CONSTRUCTION.

Application filed November 19, 1920. Serial No. 425,117.

*To all whom it may concern:*

Be it known that I, JONATHAN P. GLASBY, Jr., a citizen of the United States, and resident of East Orange, in the county of Essex and State of New Jersey, have invented certain new and useful Improvements in and Relating to Aircraft-Wing Construction, of which the following is a specification.

This invention relates to aircraft and more particularly to a construction of their supporting surfaces or wings.

The present trend of aircraft construction is toward the attainment of high speeds. However, a limiting factor at the present time is the speed at which a safe landing of aircraft is possible. Landing speeds have a great influence on the type of wing and the area, since the low speeds necessary for the average machines to land require a high lift wing, or great area or both. With the present wing sections, low flight speeds are obtained with a sacrifice in the high speed values. Similarly, with the present wing construction, high speed machines must land at dangerously high speeds. At present, the best range that can be obtained with fixed areas is about 2-1; that is, the high speed is not much more than twice the lower speed. For instance, a machine with a low speed of 45 miles per hour cannot be depended upon to safely develop a maximum speed of much over 90 miles per hour, for, at higher speeds, the angle of incidence of the wing will be so diminished as to come dangerously near the position of no lift. In any case, the travel of the center of pressure will be so great at extreme wing angles as to cause considerable manipulation of the elevator surface resulting in a further increase in the resistance and thus diminishing the speed attained. The total lift of a wing surface depends on the form of the wing, its area and the speed with which it moves in relation to the air. Traveling at a low speed requires either a wing with a high lift coefficient or an increased area. A high lift value is obtained by increasing the camber of the wing and this increased camber necessarily increases the head resistance. Increase in area necessitates heavier structural members, more exposed bracings and, hence, likewise more head resistance. All of which tend to a reduction in the maximum speed of the machine.

The present invention has for its object a construction of the lifting surfaces of aircraft which will present a minimum head resistance at high speeds and which can be so adjusted as to increase the lift-drag ratio of the wing to permit the machine to travel at relatively slow speeds when landing and taking off from the ground.

This object is attained by providing the main wing structure with a section including the leading edge and a section including the trailing edge which are adjustable with relation to the central wing surface to increase the camber of the wing when it is desired to increase its lift drag ratio.

Another object of my invention is to locate the adjusting device for the adjustable wing sections within the interior of the wing; thereby eliminating head resistance or turbulent flow caused by projecting brackets, wires and other fittings. It is obvious, however, that the adjustable wing sections could be operated by means located without the wing structure and it is to be understood that such an arrangement of the adjusting devices is well within the scope of the present invention.

Other features of my invention will be apparent upon an inspection of the accompanying drawings which illustrate a preferred embodiment thereof, wherein:—

Fig. 1 is a top view of one half of the upper supporting surface of an aircraft and a portion of the lower wing thereof, shown in relation to the fuselage of the machine and embodying my invention.

Fig. 2 is a vertical section of the wing in a fore and aft direction, showing the sections including the leading and trailing edges in position to offer the least head resistance when traveling at high speeds.

Fig. 3 is a similar section showing the leading and trailing edges when depressed to increase the lift-drag ratio for travel at relatively slow speeds.

Fig. 4 is an enlarged view of the joint between the main wing structure and an adjustable edge, showing the method of covering the space formed when the edge is depressed.

Fig. 5 is a detail view of a portion of the preferred means for adjusting the inclination of the edges.

Referring to the drawings wherein like numerals refer to similar parts throughout, I have illustrated my invention as applied to the upper wing 1 of an aircraft, in which a central section 2, containing the wing spars 3, is constructed in any well known manner having vertical front and rear faces 4 and 5 preferably closed only by suitable bracing means.

At the rear of this main wing structure 2 is arranged a wing section 6, whose surfaces prolong the wing surfaces rearwardly and converge to form the trailing edge. A similar wing section 7 is arranged in front of the main wing structure 2 whose surfaces likewise prolong the wing surface forwardly and converge to form the leading edge. I have shown these sections 6 and 7 hinged at the under surface at 8 to the main wing structure 2.

When the machine is traveling at high speed, the sections 6 and 7 will be in the position shown in Fig. 2. The curvature of the wing in a fore and aft direction, called the camber, of the sections 7, 2 and 6 in the position shown in Fig. 2 is just sufficient to afford the proper lift-drag ratio when the machine is travelling at full speed. In Fig. 3, I have illustrated the positions of the leading and rear adjustable drag sections when depressed. It is obvious that the curvature or camber is greatly increased, thus increasing the lift-drag ratio and permitting the machine to travel at a much slower speed for landing or rising from the ground.

In aeronautics, the resistance offered to the forward motion of a wing is commonly known as "drag" and, inasmuch as the purpose of the adjustable sections 6 and 7 is to increase the camber of the wing surface, thereby, increasing the head resistance of the wing structure, I shall hereafter refer to these adjustable sections as drag sections.

As a means for adjusting the drag sections in relation to the main wing structure, I prefer to provide each of the drag sections with a plurality of arms within the interior of the section, running in a fore and aft direction and extending into the central portion of the main stationary wing structure. These bars which I have illustrated at 9 and 10 are preferably secured to the lower framework of the drag sections and are slotted at their free end at 11.

Suitably located within the stationary wing section 2 and corresponding to each pair of bars 9 and 10, I provide a vertical guide 12 adapted to guide a movable member 13 (Fig. 5). This member is provided with a pair of oppositely disposed pivots or studs 14 adapted to engage in the slots 11. I prefer to construct this member 13 with a central aperture 15 through which the guide 12 passes; however, it is obvious that many other means for guiding the member 13 will occur to one skilled in the art and I do not wish to limit myself to the particular construction hereinbefore described and illustrated. For the above described device, I provide at the upper and lower extremities of the guide 12, a sheave 16 adapted to guide a cable 17. The cables 17 lead from the movable member 13 to any suitable control device, such as, a lever or wheel in the fuselage of the machine.

It is obvious, and well within the scope of the present invention, that individual operating devices may be provided for each of the bars 9 and 10; in which case, there would necessarily be provided a movable member 13, slidable on a guide 12, for each of the bars. In this way, each drag section may be elevated or depressed, irrespective of the inclination of the other drag section.

When the drag sections are depressed, it is apparent that there is a considerable space between the edge of the drag section and the edge of the stationary section. To cover this gap to prevent foreign substances from entering the same, and to prolong the stream line effect of the wing surface, I provide a flexible covering 18 in prolongation of the skin 19 of the leading drag section which laps over the skin 20 of the stationary section and, similarly, a flexible covering is provided in prolongation of the skin of the stationary portion which laps over the skin of the trailing drag section. To keep the free end of the flexible covering in close proximity to the covering of the adjacent wing section, I provide a plurality of slots 21 in the free end of the flexible covering 18. Studs 22, secured to the frame of the stationary section 2 and of the rear drag section 6, engage in the slots 22. These studs are provided with an enlarged head or other means to prevent the covering 18 from slipping off the studs.

With the foregoing wing construction, it is possible to construct a wing of relatively deep section; thus permitting heavier spars and interior bracing to be used. An aircraft provided with this wing construction may be equipped with relatively powerful motors to drive the same at high speeds. When rising from the ground, the forward and rear drag sections are depressed; thus, presenting a wing surface of increased camber with a high lift-drag ratio. The speed of the machine is thereby lessened so that it may take off or rise from the ground within a distance considerably less than would be possible with the usual wing construction. When a suitable elevation is reached the drag-sections are gradually elevated until the wing presents a surface of decreased camber, having appreciably lessened head resistance and a low lift-drag ratio. The maximum speed of the aircraft is now obtainable.

When it is desired to land the usual high speed machine, the same difficulties are encountered. The low lift-drag ratio and small head resistance require that a great speed be maintained and this necessitates a landing space of considerable length. By depressing the drag-sections, the wing is given an increased camber, the head resistance and lift-drag ratio is increased and the speed of the machine decreases to a point where a safe landing may be made within a considerably shorter distance.

It is obvious that other means may be provided for securing the drag sections to the stationary wing section which come within the scope of the present invention. The terms and expressions employed are used as terms of description and not of limitation and I have no intention in using such terms and expressions to exclude any equivalents of the features shown and described or portions thereof but recognize that various modifications in the apparatus are possible within the scope of the invention claimed.

What I claim is:

1. In wing construction for aircraft, a wing section stationary with respect to the body of the machine, a wing section adjustable relatively to said stationary section and a lever secured within said adjustable section and extending into said stationary section.

2. In an aircraft, a wing section stationary with respect of said aircraft, a section including the entire leading edge of the wing structure adjustable with respect of the stationary wing section, a lever secured within said adjustable section and extending into said stationary section, and a section including the entire trailing edge of the wing structure adjustable with respect of the stationary wing section.

3. In an aircraft, a wing section stationary with respect of said aircraft, a section including a portion of the leading edge of the wing structure adjustable with respect of the stationary wing section, a section including a portion of the trailing edge of the wing structure adjustable with respect of the stationary wing section, and levers secured within said adjustable sections and extending into said stationary sections.

4. In a wing construction for aircraft, a portion of said wing stationary with respect of the aircraft, a portion of said wing adjustably located forwardly of said stationary portion, another portion of said wing construction located rearwardly of said stationary portion and a plurality of longitudinal members located within said adjustable portions and extending into said stationary portion.

5. In aircraft wing construction, a wing section stationary with respect to the aircraft, a plurality of wing sections adjustable with respect of said stationary wing section, members extending in the approximate direction of flight on said adjustable sections and extending to the said stationary wing section, an upright member on said stationary wing section and means slidable on said upright member to which said members extending in the approximate direction of flight are pivoted.

6. In aircraft wing construction, a wing section stationary with respect to the aircraft, a plurality of wing sections adjustable with respect to said stationary wing section, a plurality of levers secured to said adjustable wing sections and extending to said stationary wing section, a member secured to said stationary wing section, means slidable on said member and secured to said levers and means to actuate said slidable member.

7. In an aircraft wing construction, a supporting surface immovable with respect to the aircraft, a section adjustable with relation to said supporting surface, a member secured to said adjustable section and extending into said supporting surface, said member being formed with a slot in the end extending into the supporting surface, an upright guide member in said supporting surface, a slide on said upright member, a pivot on said slide engaging in the aforementioned slot, a cable secured to said slide and means for actuating said slide through said cable.

8. In aircraft wing construction, a wing section stationary with respect to said aircraft, a section including the entire leading edge of the wing structure adjustable with respect of the stationary wing section, a lever secured within said adjustable leading section and extending into said stationary section, a section including the entire trailing edge of the wing structure adjustable with respect to the stationary wing section and a lever secured within the adjustable trailing section and extending into said stationary section.

9. In aircraft wing construction, a relatively stationary wing portion, a portion including one entire edge of the wing structure movable with respect to the stationary wing portion, substantially rigid means within said adjustable portion extending into said relatively stationary portion, another portion including an entire edge of the wing structure movable with respect of the relatively stationary portion, and substantially rigid means within said movable portion extending into said relatively stationary portion.

10. In wing construction for aircraft, a relatively stationary wing portion, a portion movable with respect of said relatively stationary wing portion, and substantially rigid means within said movable portion and extending into said relatively stationary wing portion.

11. In wing construction for aircraft, a relatively stationary wing portion, a portion including the entire leading edge of the wing structure adjustable with respect of said relatively stationary wing portion and substantially rigid means within said adjustable portion extending into said relatively stationary portion.

12. In wing construction for aircraft, a relatively stationary portion, a portion including the entire trailing edge of the wing structure adjustable with respect of said relatively stationary portion and substantially rigid means within said adjustable portion extending into said relatively stationary portion.

13. In an aircraft, a wing section stationary with respect of said aircraft, a section including the entire leading edge of the wing structure adjustable with respect of said stationary wing section; a section including the entire trailing edge of the wing structure adjustable with respect of the stationary wing section and a lever secured within said adjustable trailing section and extending within said stationary section.

14. In airplane wing construction, in combination a stationary wing section, a section including a portion of an edge of the wing movable with respect to the stationary section and a lever secured in the movable section and extending into the stationary section.

15. In airplane wing construction, in combination a stationary wing section, a section including a portion of an edge of the wing movable with respect to the stationary section, a lever secured in the movable section and extending into the stationary section and means to actuate the lever.

16. In airplane wing construction, in combination a stationary wing section, a section of the wing movable with respect to said stationary section, a lever secured within the movable section, and extending into said stationary section and means to operate the lever.

17. In airplane wing construction, in combination a stationary wing section, a plurality of wing sections movable with respect to said stationary section and levers secured within the movable sections and extending into the stationary section.

18. In airplane wing construction, in combination a stationary wing section, a section of the wing disposed forwardly of said stationary section and movable with respect thereto, a section of the wing disposed rearwardly of said stationary section and movable with respect thereto, and a lever in each of said movable sections and extending into said stationary section.

19. In airplane wing construction, in combination, a stationary wing section, a wing section forwardly disposed with respect to said stationary section and movable with respect thereto, a section of the wing rearwardly disposed with respect to the said stationary section and movable with respect thereto, a plurality of levers secured in said movable sections and extending into said stationary section, and means to actuate said levers.

20. In airplane wing construction, in combination, a stationary wing section, a section of the wing forwardly disposed with respect to said stationary section, and movable with respect thereto, a section of the wing rearwardly disposed with respect to said stationary section and movable with respect thereto, a lever secured within each of said movable sections and extending into said stationary section, and means to actuate said levers simultaneously.

21. In airplane wing construction, in combination, a stationary wing section, a wing section movable with respect to said stationary wing section, a lever secured within said movable wing section, and entering said stationary section, an upright member carried with said stationary section, a member slidable with respect to said upright member and to which the lever is connected and means to actuate the slidable member.

Signed at New York city, in the county of New York and State of New York, this 17th day of November, A. D. 1920.

JONATHAN P. GLASBY, Jr.